Nov. 22, 1955  W. E. HARRIS  2,724,423
METHOD AND APPARATUS FOR PREPARING
RUBBER SURFACES FOR ADHESION
Filed Jan. 30, 1952  2 Sheets-Sheet 2

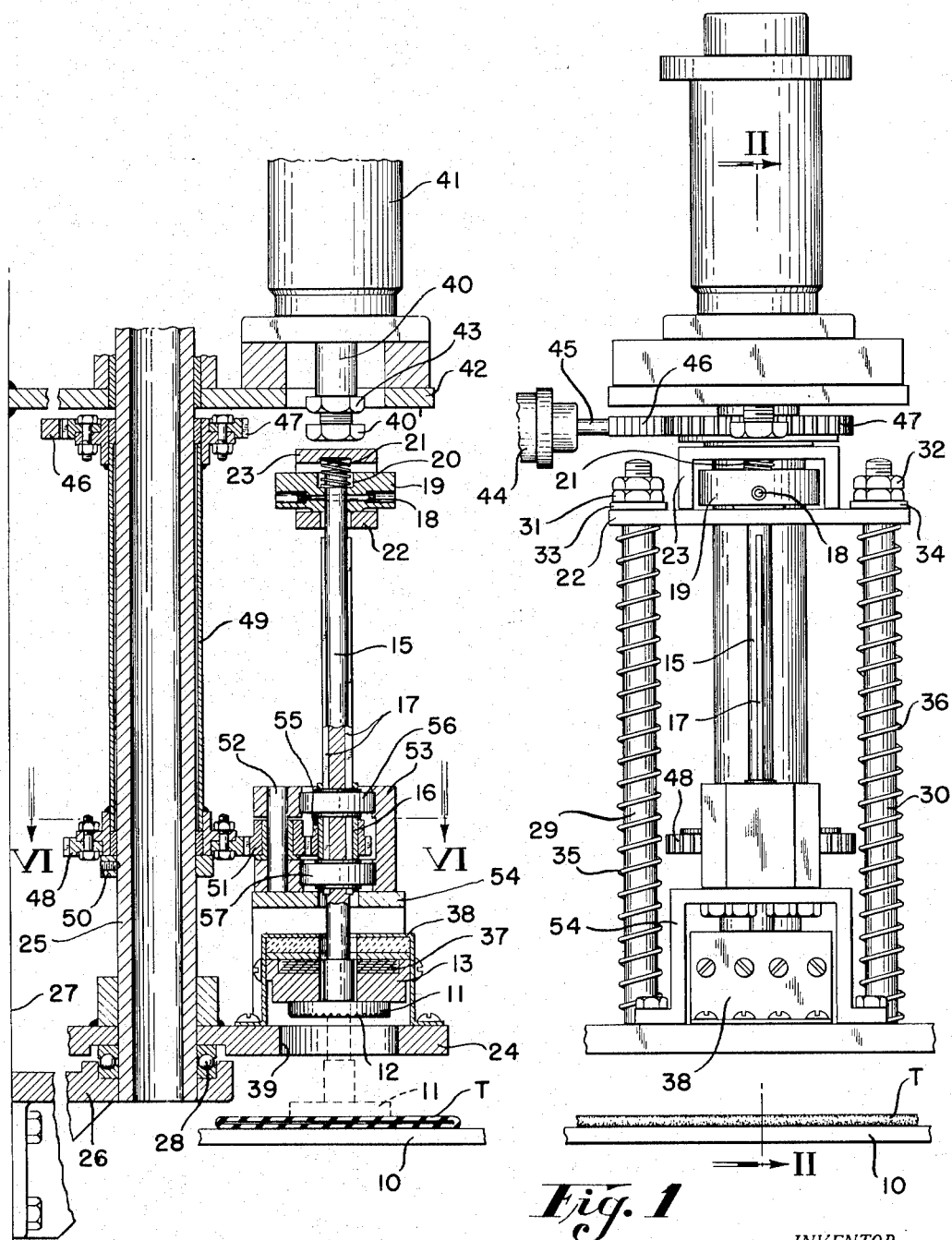

*INVENTOR.*
WILBUR E. HARRIS
BY Irwin M. Lewis
ATTORNEY.

United States Patent Office 2,724,423
Patented Nov. 22, 1955

2,724,423

METHOD AND APPARATUS FOR PREPARING RUBBER SURFACES FOR ADHESION

Wilbur E. Harris, Indianapolis, Ind., assignor to United States Rubber Company, New York, N. Y., a corporation of New Jersey Application January 30, 1952, Serial No. 269,061

7 Claims. (Cl. 154—1)

This invention relates to a method and apparatus for preparing the surface of a piece of rubber for adhesion to another piece of rubber.

It is well known that uncured rubber has an inherent tackiness and that this tackiness may be utilized to adhere rubber parts together in fabricating rubber articles preparatory to curing. It is also known that the surface loses its tackiness if foreign material such as dust, talc or soapstone accumulates on the surface and that such foreign material must be removed to restore the tackiness.

The loss of tackiness occasioned by the presence of talc or soapstone is often utilized to prevent sticking together of rubber parts during handling. For example it is the practice to cover the surfaces of uncured inner tubes with powdered soapstone to prevent their sticking together. This coating of powdered soapstone, however, presents a problem when it is desired to adhere two pieces of rubber together such as an inner tube and a rubber based valve stem.

Heretofore, it was the practice to protect the surface to which another part was to be adhered by covering the surface with a piece of cellophane or similar material. It was also the practice to buff or grind away the soapstone covered surface by means of an abrasive wheel or wire brush to thereby provide a clean tacky surface.

The first mentioned method was quite expensive and time consuming, while the second mentioned method was not only expensive, since it was a hand operation, but was dirty and non-uniform. The present invention has for one of its objects to provide a method and apparatus for preparing the surface of a piece of rubber to renew the tackiness thereof in which no protective covering such as cellophane is necessary and in which no rubber is removed thereby giving a much cleaner, cheaper and more uniform operation than by grinding or buffing.

According to the invention, the soapstone covered surface is heated and plowed so that the originally exposed surface is turned under and freshly exposed tacky rubber is turned up.

Other objects and advantages of the present invention will become apparent from the following description when read in conjunction with the accompanying drawing, wherein, Fig. 1 is a front elevational view of the apparatus of the present invention;

Fig. 2 is a cross sectional view taken on the line II—II of Fig. 1;

Figure 3:
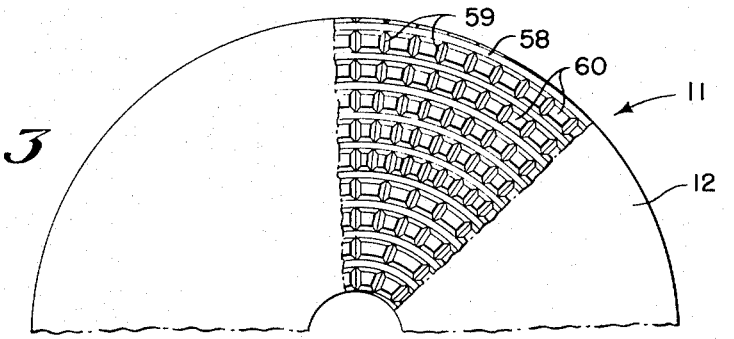
Fig. 3 is a partial view showing the details of one embodiment of the plowing surface of the plowing member of the apparatus of the invention.

Referring to the drawing and in particular to Figs. 1 and 2, the apparatus of the invention includes a support 10, upon which the piece of rubber is placed. In Figs. 1 and 2 the piece of rubber is a section of inner tube stock T to which a rubber base valve stem (not shown) is to be attached.

A plowing member 11 in the form of a circular plate (Fig. 2) is supported for movement toward and away from the support 10 and is adapted to be pressed against the tube section T as shown by the dotted lines. The contacting face 12 of the plowing member 11 is roughened by grooving as shown in either Fig. 3, Fig. 4, or Fig. 5 as will be later described in detail.

This roughened face 12 performs the plowing of the surface of the rubber when it is rotated relative to the tube section T carried on the support 10 by a mechanism which will hereinafter be described. The plowing tool 11 is heated preparatory to the plowing operation by being held in contact with a heating element 13.

Figure 7:
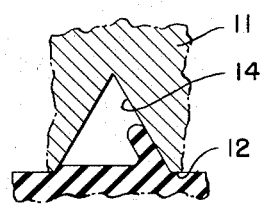
Fig. 7 is a sectional view illustrating how the plowing tool turns under the originally exposed surface of a piece of rubber and turns up freshly exposed tacky rubber without removing any of the material.

The effect of the rotation of the heated plowing member 11 on the rubber tube section is shown in Fig. 7. As shown, the grooves on the face 12 of the member 11 provide a plowing edge 14 which digs into the rubber surface which is heated by the member 11 and the surface which was originally exposed is turned under and freshly exposed tacky rubber is turned up.

The plowing member 11 is secured to the end of a rod 15, which in turn is supported and guided for axial movement in a sleeve 16. Rod 15 is provided with elongated splines 17 which ride in mating grooves in the sleeve 16 to allow axial movement but prevent relative rotation between the rod 15 and the sleeve 16.

Rod 15 has a collar 19 attached to the upper end thereof by means of a tapered pin 18. Collar 19 is provided with an annular recess 20 in the top thereof which surrounds the end of the rod 15 and which receives a compression spring 21. A plate 22 provided with an opening through which the rod 15 passes is positioned below the collar 19 and abuts the lower face of the collar 19.

Plate 22 has secured to the upper face thereof a U-shaped member 23 which bridges over the collar 19 and is engaged by the upper end of the compression spring 21. Member 23 and plate 22 are therefore normally held in the uppermost position as shown in Fig. 2 by the spring 21. This structure serves to limit the pressure exerted by the plowing member 11 on the rubber tube section T, as will hereinafter be brought out.

An upright standard 25 is supported by and secured to a bracket 26 which in turn is secured to a suitable supporting framework 27 (partially shown in Fig. 2).

A lower plate 24 is supported for free rotation on standard 25 and an anti-friction bearing 28 is interposed between the plate 24 and bracket 26 to take the axial thrust of the plates. Plate 24 has secured thereto two upwardly extending guide rods 29 and 30. Guide rods 29 and 30 extend through holes in the plate 22 at each side of the rod 15. Nuts 31 and 32 and washers 33 and 34 provided on the upper ends of the rods 29 and 30 limit the upward movement of the plate 22. Compression springs 35 and 36 surround the guide rods 29 and 30 and abut at one end on the upper face of plate 24 and at the other end on the lower face of plate 22. Springs 35 and 36 serve to hold the rod 15 and the plowing member 11 in the uppermost position against the heating element 13 and to return the plowing member to this position after it has been moved downwardly to plow the surface of the tube section T.

The heating element 13 which is heated by an electrical resistance element 37 from a source of electrical energy (not shown) is secured to plate 24 by means of a U-shaped strap 38 which bridges an opening 39 in the plate 24 through which the plowing member 11 is adapted to be moved. The heating element 13 is provided with a hole therethrough, through which the rod 15 extends.

Rod 15 and plowing member 11 secured to the end thereof are moved downwardly by means of the piston rod 40 of a single acting fluid pressure cylinder 41 carried by a plate 42 which in turn is secured to framework 27. Plate 42 also serves to give additional support to the standard 25 which extends through an opening therein. The effective length of the piston rod 40 may be varied by a threaded extension 40' which threads into the end of the piston rod 40 and which is locked in an adjusted position by means of a lock nut 43.

Admission of fluid under pressure to the cylinder 41 extends the piston rod 40 so that the extension 40' contacts the member 23. The force exerted on member 23 is transmitted through spring 21 and collar 19 to rod 15 and moves rod 15 and plowing member 11 to the position shown in the dotted lines of Fig. 2. As rod 15 is moved, springs 35 and 36 surrounding guide rods 29 and 30 are compressed as plate 22 moves downwardly with rod 15. When the plowing member 11 contacts the tube section T, resistance to further movement of the member 11 is greatly increased and at this point compression spring 21 is compressed to thereby limit the pressure exerted on the tube section T by the plowing member 11. The effective length of the rod 40 and the strength of the spring 21 are selected to give a pressure on the tube of approximately 10 pounds per square inch. When the pressure is released from the cylinder 41, the springs 35 and 36 return the rod 15 and plowing member 11 to the uppermost position as shown in Fig. 2.

Rotation of the plowing member 11 while it is pressed against the tube section T to plow the surface to turn up freshly exposed tacky rubber is provided by means of a double acting fluid pressure cylinder 44 (Fig. 1) and a gear train which transmits the linear movement of the piston rod 45 of the cylinder 44 to rotary movement of the plowing member 11. This gear train includes a rack 46 secured to the end of the piston rod 45. The rack 46 meshes with a pinion 47 journaled on the standard 25. Pinion 47 is connected by means of a sleeve 49 to a lower gear 48 also journaled on the standard 25. Axial movement of pinion 47, sleeve 49 and gear 48 is prevented by collar 50 secured to standard 25 below gear 48. Gear 48 meshes with a gear 51 mounted for free rotation on a shaftf 52 secured in a block 53. Block 53 is secured to a U-shaped bracket 54 which bridges the heating element 13 and is secured to the plate 24. Gear 51 meshes with a gear 55 which surrounds and is secured to the sleeve 16. Sleeve 16 is mounted in anti-friction bearings 56 and 57 which are also carried by the block 53. The rotary movement of sleeve 16 is transmitted to rod 15 and member 11 by elongated splines 17 as previously described.

It will be noted that plate 24 is rotatable about the standard 25 so that it and the structure supported thereon may be moved angularly away from the position above the support 10 so that subsequent operations may be performed on the tube section T.

Figure 4:
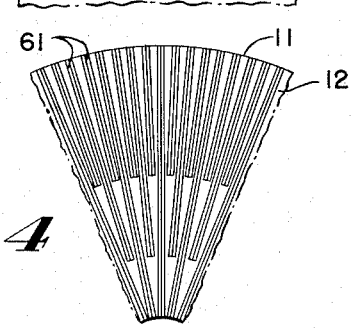
Fig. 4 is a partial view showing the details of another embodiment of the plowing surface of the plowing member of the present invention.
Figure 5:
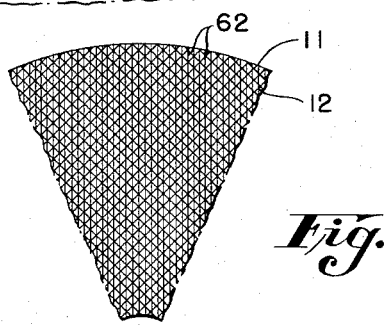
Fig. 5 is still another partial view showing the details of an embodiment of the plowing surface of the plowing member of the apparatus of the present invention.
Figure 6:
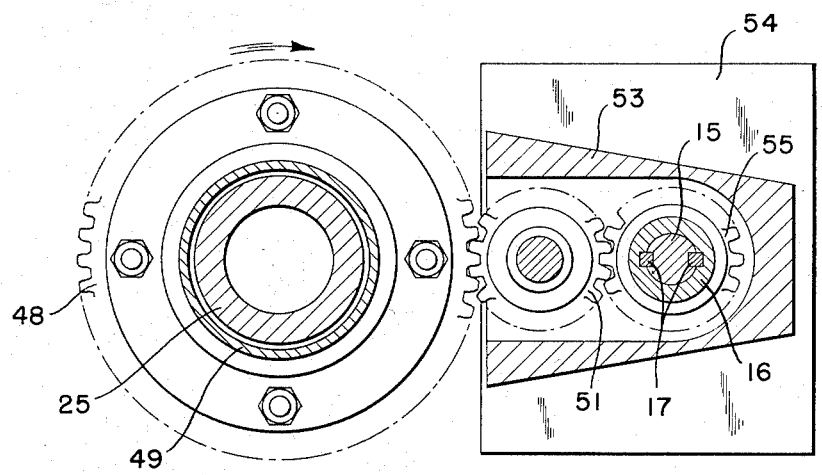
Fig. 6 is a sectional view taken on the line VI—VI of Fig. 2 showing the gear train for transmitting rotary movement to the plowing member of the invention.

Referring to Figs. 3, 4 and 5 there is shown three modifications for the plowing face 12 of the plowing member 11. In Fig. 3, the face is formed with a continuous spiral groove 58, trapezoidal in cross-section, which is cut through by a plurality of radially extending V-shaped grooves 59 to form a spiral pattern of projections 60. In Fig. 4, the plowing face 12 is formed by a plurality of spaced radially extending V-shaped grooves 61. In Fig. 5, the plowing face 12 is formed by a plurality of criss-crossed V-shaped grooves 62 which form a knurled surface. In each instance the wall of the V-shaped groove provides the plowing edge as shown at 14 in Fig. 7. While not shown, it is to be understood that the grooves are provided for a full 360°.

The preferred form for the plowing member is as shown in Fig. 3. This form is self-cleaning as any foreign material which might be present in the grooves is forced out through the continuous spiral groove 58 as the plowing member is rotated in contact with the tube section.

Operation

Referring to Fig. 2, the apparatus of the present invention is shown in solid lines in its non-operating position. As shown, the plowing member 11 is in contact with the heating element 13 and is heated thereby. Preparatory to operating the apparatus, a piece of rubber such as an inner tube section T is placed on the support 10. The operator then admits pressure to the cylinder 41 by suitable controls (not shown). Admission of fluid under pressure to the cylinder 41 extends the piston rod 40 thereof to force rod 15 and the plowing member 11 away from the heating element 13 and against the surface of the inner tube section T and the section T is heated by the heated plowing member 11. The pressure exerted on the section T by the plowing member 11 is limited by the spring 21. While this pressure is maintained, fluid under pressure is admitted to pressure cylinder 44 to extend the piston rod 45. The movement of piston rod 45 is transmitted to the rod 15 to rotate the plowing member 11 by means of rack 46 and gears 47, 48, 51 and 55. Rotation of heated plowing member 11 while it is pressed against the tube section T plows under the originally exposed surface and turns up freshly exposed tacky rubber as shown in Fig. 7. The member 11 need be rotated only slightly so that the full surface beneath the member 11 is plowed.

After the member 11 is rotated the pressure on cylinder 41 is released and springs 35 and 36 return the member 11 to its uppermost position against the heating element 13. The pressure on cylinder 42 is then reversed to withdraw the piston rod 45. The apparatus is then ready for another cycle of operation.

From the above description it can be seen that there is provided a method and apparatus which will quickly and uniformly renew the tackiness of an uncured rubber surface without the removal of any of the material from the surface.

It is to be understood that the above description and accompanying drawings are for the purpose of illustration only and not by way of limitation and that changes and modifications may be made therein without departing from the spirit and the scope of the invention.

Having thus described my invention, what I claim and desire to protect by Letters Patent is:

1. The method of preparing the surface of a piece of uncured rubber for adhesion to another piece of rubber comprising, heating the surface of the rubber, and plowing the heated surface to turn under the originally exposed surface and turn up freshly exposed tacky rubber without removing any rubber.

2. The method of preparing the surface of a piece of uncured rubber for adhesion to another piece of rubber comprising, heating the surface of the rubber, turning under a plurality of small sections of the heated surface and turning up sections of freshly exposed tacky rubber without removing any rubber.

3. Apparatus for preparing the surface of a piece of rubber for adhesion to another piece of rubber comprising, a support for a piece of rubber, a plowing member having a grooved surface, means for pressing said grooved surface against the surface of the rubber, means for heating the surface of the rubber, and means for moving said grooved surface relative to said support and the rubber thereon to thereby plow under the originally exposed surface and turn up freshly exposed tacky rubber.

4. Apparatus for preparing the surface of a piece of rubber for adhesion to another piece of rubber comprising, a support for a piece of rubber, a plowing member having a grooved surface, means for moving said grooved surface towards said support and against the surface of a piece of rubber carried on said support, means for heating said plowing member, and means for moving said grooved surface relative to said support in a plane parallel to said support to thereby plow under the originally exposed surface of the rubber and turn up freshly exposed tacky rubber.

5. Apparatus for preparing the surface of a piece of rubber for adhesion to another piece of rubber, comprising, a support for a piece of rubber, a plowing member having a grooved surface, means for moving said grooved surface towards said support and against the surface of a piece of rubber carried thereon, means for heating said plowing member and means for rotating said surface in a plane parallel to said support to thereby plow under the originally exposed surface of the rubber and turn up freshly exposed tacky rubber.

6. Apparatus for preparing the surface of a piece of rubber for adhesion to another piece of rubber comprising, a plowing member having a roughened surface providing plowing edges, a support for a piece of rubber, means for moving said surface towards said support, a heating element which said plowing member engages while at rest so that it is heated thereby, means for moving said roughened surface towards said support and means for moving said surface relative to and in a plane parallel to said support to thereby plow the surface of the rubber to turn under the originally exposed surface and turn up freshly exposed tacky rubber.

7. Apparatus for preparing the surface of a piece of rubber for adhesion to another piece of rubber comprising, a support for a piece of rubber, a plowing member having a roughened surface, means for moving said roughened surface towards said support, means for heating said plowing member, means for moving said surface relative to said support to plow the surface of the rubber to turn under the originally exposed surface and turn up freshly exposed rubber and means for limiting the pressure exerted on said piece of rubber by said roughened surface.

References Cited in the file of this patent

UNITED STATES PATENTS

| Number | Name | Date |
| --- | --- | --- |
| 1,385,240 | Bell | July 19, 1921 |
| 1,465,177 | Richter | Aug. 14, 1923 |
| 1,719,880 | Eppler | July 9, 1929 |
| 1,938,816 | Eger | Dec. 12, 1933 |
| 1,961,908 | Murray | June 5, 1934 |
| 2,035,819 | Madge | Mar. 31, 1936 |
| 2,240,559 | Hawkinson | May 6, 1941 |
| 2,364,384 | Oakes | Dec. 5, 1944 |
| 2,432,154 | Hawkinson | Dec. 9, 1947 |
| 2,504,090 | Sanderson | Apr. 11, 1950 |

FOREIGN PATENTS

| Number | Country | Date |
| --- | --- | --- |
| 152,836 | Great Britain | Oct. 28, 1920 |